United States Patent [19]

Fogel

[11] Patent Number: 4,517,210

[45] Date of Patent: May 14, 1985

[54] PROCESS FOR PREPARING A FRUIT AND CEREAL PRODUCT

[75] Inventor: Harvey P. Fogel, Richland, Mich.

[73] Assignee: General Foods Corporation, White Plains, N.Y.

[21] Appl. No.: 500,803

[22] Filed: Jun. 7, 1983

Related U.S. Application Data

[63] Continuation of Ser. No. 293,070, Aug. 17, 1981, abandoned.

[51] Int. Cl.$^3$ .................... A23L 1/164; A23B 7/00
[52] U.S. Cl. .................... 426/392; 426/506; 426/621
[58] Field of Search .............. 426/559, 560, 620, 621, 426/96, 102, 293, 70, 392, 506

[56] References Cited

U.S. PATENT DOCUMENTS

| | | | |
|---|---|---|---|
| 2,693,419 | 11/1954 | Gager | 426/102 X |
| 3,366,485 | 1/1968 | Moen et al. | 426/620 |
| 3,833,747 | 9/1974 | Cording, Jr. | 426/289 |
| 3,958,021 | 5/1976 | Cook | 426/268 |
| 4,256,772 | 3/1981 | Shanbhag et al. | 426/620 X |

FOREIGN PATENT DOCUMENTS 906829  8/1972  Canada ........................ 426/621

Primary Examiner—S. Leon Bashore
Assistant Examiner—K. M. Hastings
Attorney, Agent, or Firm—Sam D. Walker; Thomas R. Savoie; Daniel J. Donovan

[57] ABSTRACT

An improved method for preparing a cereal of the dry crisp type which is generally served with sugar and cold milk or cream has been developed. The method consists of having the relatively high moisture content of the discrete cereal pieces equilibrate with that of the substantially dry discrete fruit pieces before or during storage. The equilibration of moisture results in the cereal pieces being crisp and the fruit pieces obtaining a desired degree of softness and moistness.

12 Claims, No Drawings

PROCESS FOR PREPARING A FRUIT AND CEREAL PRODUCT

This is a continuation of application Ser. No. 293,070, filed Aug. 17, 1981, now abandoned.

TECHNICAL FIELD

The present invention relates to a method of preparing a novel cereal product having non-cereal material as an included ingredient. More specifically, the invention pertains to the treatment of cereal and fruit which results in a dry breakfast cereal that has crisp flakes and soft textured fruit pieces.

The combination of fruit and dry breakfast cereal has significant consumer appeal. The food processing industry, recognizing the wide enjoyment of fresh fruit with dry breakfast cereals has in the past developed products composed of dry cereal combined with dehydrated fruit. Although enjoying some consumer acceptance, manufacturers of breakfast cereals have been aware of the deficiencies inherent in the breakfast products in which a dry cereal is packaged with a dehydrated fruit and have sought methods to improve upon the quality of these products.

Major among the problems encountered with the dehydrated fruits for use as an admix with a dry cereal is that of texture and flavor. Generally, in order to have a satisfactory degree of stability it is the usual practice to have a tough fibrous structure and texture. The difference in texture between the fresh fruit and its dried counterpart, dehydrated sufficiently to prevent spoilage, is of such magnitude as to make the dried fruit unappetizing and unacceptable to much of the consuming public. Also, the dehydrated fruit does not readily reconstitute to a soft, acceptable texture upon addition of cold milk to the cereal. In most instances by the time the fruit pieces have absorbed sufficient liquid to attain an acceptable texture, the cereal has become unappetizingly soggy.

Freeze-dried fruit pieces, although having the capability of reconstituting quickly with cold milk, are costly to produce and upon rehydration, yield products which are inferior to their fresh fruit counterparts.

Conversely, if the fruit is only dehydrated to the extent it retains a high degree of moisture in order to have a soft texture, it will either not be bacteriologically stable at room temperature or, when admixed with the dry cereal, will lose moisture to the cereal and thus cause the cereal to become soggy and the fruit to become dry, hard and excessively tough.

Another limiting factor in the use of fruits such as whole raisins is their high density. This limitation restricts their use to ready-to-eat breakfast cereals of the heavier densities. With lower density cereals such a corn flakes, segregation of whole raisins occurs. As a consequence, the fruit pieces settle to the bottom of the box and the consumer is offered a package having a non-uniform mixture of breakfast cereal and fruit.

A method to solve the difficulties of adding fruit or fruit-like products to cereal has been to encase dried fruit pieces within moist cereal shreds, and then to toast and dry the product. This is shown by U.S. Pat. No. 2,693,419 to Gager. Another process to overcome the difficulties of the prior art is discussed in U.S. Pat. No. 3,366,485 to Moen et al. Therein, an expanded or puffable fruit piece is enclosed within a dough matrix and cut into pellets. It is disclosed that the moisture content of the cereal should be less than 6%. However, neither of these approaches represent an adequate solution to preparing a ready-to-eat breakfast cereal comprised of discrete fruit and cereal pieces.

Other references teach control of the hygroscopicity of the fruit. U.S. Pat. No. 3,833,747 to Cording et al. discloses obtaining a dehydrated fruit of reduced hygroscopicity by removing from the fruit piece natural hygroscopic monosaccharides and replacing them with less hygroscopic sugars. Similarly, U.S. Pat No. 3,958,021 to Cook teaches a process for a stable hydrophillic fruit piece by coating the fruit piece with a fat. These two references would be used by the skilled artisan to produce a dry breakfast cereal wherein, the fruit piece would remain crisp by not absorbing moisture.

Another approach to produce ready-to-eat breakfast cereal is shown in Canadian Pat. No. 906,829 to Vollink. Therein, fruit flakes are sliced very thin in an attempt to preserve softness. Still yet another approach to combining discrete fruit and cereal pieces is disclosed in U.S. Pat. No. 4,256,772 to Shanbhag et al. Therein fruit pieces are treated with a moisture stabilizing solution to equate the water activity of the fruit with the water activity of the cereal.

There remains, however, a present need for an improved ready-to-eat cereal. Accordingly, the present invention is intended to supply the need for cereal products containing tasteful fruit and/or fruit pieces in which the cereal has a desired degree of crispness and the fruit has a characteristic of soft texture and an appealing taste quality during extended shelf life.

DISCLOSURE OF THE INVENTION

For clarity in discussing generally any breakfast cereal containing a fruit or fruit simulated product, the grain derived or cereal portion, i.e. flakes, biscuits, etc., will be called the "cereal piece" or "cereal particle," the fruit related portion, i.e., fruit or fruit simulated portion, will be called the "fruit piece" or "fruit particle" and the combination of these, which is generally the total packaged product, will be called a "ready-to-eat cereal," or "ready-to-eat breakfast cereal," or "breakfast cereal."

In accordance with its more specific aspects, the present invention involves producing a fruit piece having a moisture content below 5% and preferably in the range of about 0.5% to 3% moisture. This fruit piece can be admixed with a cereal piece. The cereal piece will have a moisture content ranging from about 5% to 11% and preferably in the range of 6% to 9%. The corresponding initial water activity of the fruit piece will range from 0.05 to 0.40 and the cereal piece will range from 0.40 to 0.65. When the cereal and fruit pieces are admixed, the difference in water activity levels and moisture content will cause moisture to migrate from the cereal to the fruit piece. This migration continues until the water activity of the cereal and fruit pieces equilibrate. In the present invention the cereal and fruit pieces will reach an equilibrium water activity after at least seven days storage.

Water activity is a term used in the food processing art. Briefly, water activity is the measure of the ratio of the equilibrium vapor pressure of water above a substance, such as a food, to the vapor pressure of pure water, both taken at the same temperature. It is, therefore, a dimensionless number and to say a cereal at 6% moisture has a water activity of 0.45 at 70° F., in effect, amounts to saying that the water equilibrium vapor pressure above the cereal is but 0.45 the value of that of the water vapor pressure above pure liquid water at the same temperature.

It has been determined that a sufficient degree of moisture migration will occur soon after the packaging and storage provided the difference in the respective water activities exceed from about 0.20 to about 0.35 at the time of blending and packaging. More preferably, the difference in water activities should be between about 0.25 and about 0.35. Of course, the extent to which water activities can be different and yet effect sufficient moisture migration to yield moistness in the fruit and dryess and crispness in the cereal upon storage will be determined, to a considerable degree, by the relative amounts of each component blended, the extent to which the fruit piece is dried below its critical moisture and the extent to which the cereal is hydrated at the time of blending and packaging. For example, when a small amount of fruit pieces are employed, the moisture content of the cereal piece would be lower to reach a desired $A_w$, as compared to having a large amount of fruit pieces (at the same original fruit piece $A_w$) wherein the cereal piece would have a higher moisture content to reach the same desired $A_w$. Depending upon the particular type of fruit, both as to physical form and raw material, there is a moisture content range below which the fruit is no longer considered to have acceptable softness. This level of moisture is commonly termed the "critical moisture". Therefore, at the time of packaging of the moist cereal particles with the dry fruit particles, the cereal particles can have an $A_w$ as high as about 0.65.

Any desired ratio of cereal pieces to fruit pieces may be admixed together. This will be based upon a number of considerations of the type of fruit piece employed, the relative cost of the fruit piece, consumer appeal and processing control. While this list is not exhaustive of variables to be considered, it has been found that a preferred admixture ranges from about 65% to 95% cereal pieces to about 5% to 35% fruit pieces. More preferably 80% to 92% cereal pieces to 8% to 20% fruit pieces are desired.

The preferred embodiments of the invention will be set forth in terms of whole fruit units and fruit pieces, such as those of raisins, currants, dates, prunes, figs, apples, bananas, pears, peaches, pineapple, apricots, strawberries, blueberries, and the like. However, the invention with relatively minor variations in processing techniques and conditions is applicable to other fruits which can be combined with cereal pieces to form a breakfast cereal.

Among the fruit units that may be employed, it is convenient to use those which are relatively small in size. However, fruits which are only available in units or segments somewhat inconveniently large can be diced or otherwise cut to a suitable degree to render them more adapted to blending with the cereal pieces.

It is also within the scope of the present invention to combine the cereal pieces with fruit pieces that are derived from fruit. This would include pieces such as nuggets, flakes, slice, chunks, as well as, expanded and extruded pieces. The fruit pieces may be dried by any conventional method of drying to the requisite moisture content.

While in storage, the fruit pieces being relatively dry do not stick together or otherwise cause clumping with the cereal pieces. The breakfast cereal remains free flowing over a long storage period. In addition, the fruit pieces are of such density in comparison to the moist cereal flakes that objectionable segregation in the package does not normally occur. (All density measurement are in ounces per cubic inch or "$oz/in^3$".) The initial density of the fruit piece ranges from about 0.05 to 0.30 $oz/in^3$, and more preferably from 0.20 to 0.27 $oz/in^3$. The initial density of the cereal piece ranges from about 0.05 to 0.30 $oz/in^3$, and more preferably from 0.09 to 0.19 $oz/in^3$.

It is a preferred embodiment of the invention that the fruit piece and dry cereal be packaged in a paperboard package with a protective liner or other suitable container which minimizes water vapor transmission between the product and the atmosphere; accordingly, any moisture equilibrium change in the product should preferably be that which proceeds between the dry packaged breakfast cereal flake or puff and the fruit piece.

In order that the present invention may be more clearly understood, reference will now be had to the following examples which illustrate representative methods of combining the fruit and cereal and describe the resulting fruit and cereal products and their storage stabilities. In the examples which follow and which are intended to be illustrative and not exhaustive of the invention, $A_w$ stands for water activity, n/a stands for not available, and the parts and percentages expressed are by weight.

EXAMPLE

Post ® 40% Bran Flakes are sprayed with water to increase the moisture level. Initial moisture level was 2.2% and after spraying had a final moisture level about 7.3%. Commercially available dried fruit pieces had an initial moisture ranging from 0.7% to 19.9%. Initial texture on all fruit pieces was crisp, except raisins which were chewy.

Cereal pieces and fruit pieces were admixed at a ratio of 10% fruit and 90% cereal. The admixture was then placed in sealed jars and stored at 113° F. The blend of fruit and cereal pieces was evaluated after 7 days and 14 days. The following table presents the results of this procedure for several different fruit and cereal pieces which when admixed resulted in a ready-to-eat breakfast cereal. Only the more pertinent results have been presented to explain how Applicant's invention operates.

| | FRUIT PIECE | | | | CEREAL PIECE | | | | TEXTURE OF FRUIT AND CEREAL PIECES | | | | |
|---|---|---|---|---|---|---|---|---|---|---|---|---|---|
| Type | Initial $A_w$ | Initial % Moisture | Final $A_w$ | Final % Moisture | Initial $A_w$ | Initial % Moisture | Final $A_w$ | % Moisture | Initial Fruit texture | After 7 Days | After 14 days | Pour-ability | Final Cereal Piece |
| 1. Apple Pieces | .28 | 1.9 | .52 | 13.3 | n/a | 10.9 | .53 | 8.8 | hard, tough | very soft | same | free flowing | tough |
| 2. Apricot Nuggets | .20 | 0.7 | .51 | 10.5 | n/a | 10.9 | .49 | 9.3 | hard crubchy | tough chewy | same | free flowing | tough |
| 3. Apple | .24 | 2.9 | .51 | 13.4 | n/a | 10.9 | .50 | 10.3 | hard tough | tough | same | free | tough |

-continued

| | | FRUIT PIECE | | | | CEREAL PIECE | | | | TEXTURE OF FRUIT AND CEREAL PIECES | | | | |
|---|---|---|---|---|---|---|---|---|---|---|---|---|---|---|
| | Type | Initial $A_w$ | Initial % Moisture | Final $A_w$ | Final % Moisture | Initial $A_w$ | Initial % Moisture | Final $A_w$ | % Moisture | Initial Fruit texture | After 7 Days | After 14 days | Pourability | Final Cereal Piece |
| 4. | Prune Nuggets | .27 | 1.1 | .51 | 11.5 | n/a | 10.9 | .50 | 8.8 | hard, crunchy & tough | chewy tough chewy | same | flowing free | tough |
| 5. | Date Nuggets | .25 | 0.7 | .52 | 5.9 | n/a | 10.9 | .55 | 10.4 | hard crunchy | tender chewy | same | flowing free | tough |
| 6. | Currants | n/a | 7.7 | .53 | 9.7 | n/a | 10.9 | .55 | 10.2 | soft, moist & chewy | soft | same | flowing free | tough |
| 7. | Banana | n/a | 1.2 | .43 | 3.5 | n/a | 10.9 | .50 | 8.9 | brittle crisp | tough | same | flowing free | tough |
| 8. | Apple Pieces | .28 | 1.9% | .19 | 2.5 | .23 | 2.2 | .21 | 2.5 | hard, tough | same | same | flowing | crisp |
| 9. | Apple Nuggets | .24 | 2.9 | .22 | 2.7 | .23 | 2.2 | .20 | 2.8 | hard, tough | tough | same | | crisp |
| 10. | Apple Pieces | .28 | 1.9 | .39 | 8.1 | .51 | 7.3 | .44 | 6.3 | hard, tough | soft | soft chewy | free flowing | less crisp |
| 11. | Date Flakes | .22 | 1.2 | .39 | 3.0 | .51 | 7.3 | .48 | 7.3 | crisp fragile | soft chewy | same | flowing free | crisp less |
| 12. | Apple Flakes | .21 | 2.2 | .37 | 8.2 | .51 | 7.3 | .38 | 6.7 | crunchy tough | soft | same | flowing free | crisp less |
| 13. | Apricot Nuggets | .20 | 0.7 | .37 | 5.7 | .51 | 7.3 | .37 | 6.7 | hard crunchy | hard tough | same | flowing free | crisp less |
| 14. | Apple Nuggets | .24 | 2.9 | .38 | 7.8 | .51 | 7.3 | .37 | 6.3 | hard tough | soft | same | flowing free | crisp less |
| 15. | Peach Nuggets | n/a | 1.0 | .36 | 5.5 | .51 | 7.3 | .32 | 6.3 | hard brittle | hard tough | same | flowing free | crisp less crisp |

It should be understood that the foregoing is merely illustrative of a certain embodiments of the invention and variations may be made by those skilled in the art without departing from the spirit and scope of the invention.

What is claimed:

1. A process of preparing a breakfast food having discrete pieces of fruit blended with discrete pieces of cereal particles which comprises:
   (a) preparing discrete bran cereal particles with a moisture of about 2.2%;
   (b) hydrating said cereal particles with an amount of moisture effective to give said cereal particles:
      (i) an $A_w$ of at least about 0.51 and a moisture content in excess of about 7.3%, and
      (ii) a density between about 0.05 and 0.30 oz/in$^3$;
   (c) preparing discrete fruit particles wherein said fruit particles are whole fruit units, fruit pieces, and combinations thereof having:
      (i) an $A_w$ such that there is a ($A_w$ cereal particles-$A_w$ fruit particles) difference between about 0.20 and about 0.35,
      (ii) a moisture content below 5%, and
      (iii) a density between about 0.05 and about 0.30 oz/in$^3$;
   (d) admixing the discrete cereal particles with the discrete fruit particles to form a ready-to-eat breakfast cereal, wherein said cereal particles comprise between about 65 and about 95% of said admixture;
   (e) packaging said admixture in a container wherein said container is effective to minimize water vapor transfer between the product and the atmosphere; and
   (f) transferring moisture from the cereal particles to the fruit particles by storing the cereal-fruit admixture for at least 7 days.

2. The process according to claim 1 wherein the initial moisture content of the discrete fruit particles is from about 0.5% to 3%.

3. The process according to claim 2 wherein the fruit particles have an initial density from about 0.20 to 0.27 oz/in$^3$.

4. The process according to claim 2 wherein the cereal particles have an initial density from about 0.09 to 0.19 oz/in$^3$.

5. A process according to claim 1 wherein the fruit is chosen from the group: apples, dates, apricots, currants, bananas, prunes, peaches, and combinations thereof.

6. The process according to claim 5 wherein the fruit particles are prepared from apples.

7. A process according to claim 5 wherein the fruit particles are prepared from dates.

8. A process according to claim 5 wherein the fruit particles are prepared from apricots.

9. A process according to claim 5 wherein the fruit particles are prepared from currants.

10. A process according to claim 5 wherein the fruit particles are prepared from bananas.

11. A process according to claim 5 wherein the fruit particles are prepared from prunes.

12. A process according to claim 5 wherein the fruit particles are prepared from peaches.

* * * * *